United States Patent [19]
Gadsby

[11] Patent Number: 5,337,354
[45] Date of Patent: Aug. 9, 1994

[54] TIP-RING VOLTAGE CORRECTION CIRCUIT

[75] Inventor: Winston M. Gadsby, Herndon, Va.

[73] Assignee: Hubbell Incorporated, Orange, Conn.

[21] Appl. No.: 921,681

[22] Filed: Jul. 30, 1992

[51] Int. Cl.$^5$ ............................................. H04M 3/00
[52] U.S. Cl. ................................ 379/399; 379/377; 379/413
[58] Field of Search ............... 379/376, 377, 378, 399, 379/401, 403, 404, 413, 405, 20, 34, 382

[56] References Cited

U.S. PATENT DOCUMENTS

| | | | |
|---|---|---|---|
| 4,300,023 | 11/1981 | Kelley et al. | 379/405 |
| 4,315,106 | 2/1982 | Chea, Jr. | 379/377 |
| 4,406,929 | 9/1983 | Pace et al. | 379/402 |
| 4,431,874 | 2/1984 | Zobel et al. | 379/345 |
| 4,472,608 | 9/1984 | Beirne | 379/399 |
| 4,532,381 | 7/1985 | Rosenbaum et al. | 379/377 |
| 4,661,978 | 4/1987 | Hirata | 379/399 |
| 4,803,721 | 2/1989 | Schingh | 379/399 |
| 5,172,409 | 12/1992 | Susak | 379/377 |

Primary Examiner—James L. Dwyer
Assistant Examiner—Scott L. Weave
Attorney, Agent, or Firm—Jerry M. Presson; Walter C. Farley

[57] ABSTRACT

A correction circuit for use with a subscriber line interface circuit (SLIC) to control the level of a DC voltage supplied to the tip and ring wires of a telephone circuit includes a current sink with a differential operational amplifier. The amplifier output terminal is connected through an output resistor to a control input of the SLIC which influences the DC voltage level. The non-inverting input terminal of the amplifier is connected to the tip or ring wire, or both, and the inverting input terminal is connected to the output resistor and a DC reference circuit. The level of the voltage supplied by the SLIC is a function of the current supplied by the correction circuit.

5 Claims, 2 Drawing Sheets

5,337,354

TIP-RING VOLTAGE CORRECTION CIRCUIT

FIELD OF THE INVENTION

This invention relates to a circuit for use with a subscriber line interface circuit (SLIC) to control the open circuit tip-ring voltage to eliminate false indications of an off-hook condition.

BACKGROUND OF THE INVENTION

A solid-state subscriber line interface circuit (SLIC), notably the Ericsson PBL3764 SLIC, provides a direct current (DC) voltage output which powers a telephone or other device over the tip and ring lines of the channel unit in which the SLIC chip is installed. In the conventional use of that circuit, the open-circuit DC voltage can be set to any fixed voltage from 20 volts to 50 volts. It must be at least 6 volts below the magnitude of the lowest expected talk battery voltage. For example, if the expected talk battery range is 42.75 to 56 VDC, the open-circuit DC voltage could be set as high as 36.75 V.

When this SLIC is used in equipment interfacing certain types of subscriber equipment, the DC voltage produced by the SLIC chip is monitored by the subscriber equipment and an indicator light is energized when the DC voltage falls below a predetermined level, indicating that a telephone instrument or other device is off-hook. The threshold at which this occurs varies with the specific equipment. The indicator light can be, for example, on a telephone operator's switchboard or on a multiple-line telephone instrument.

It has been found that conditions in the system other than an off-hook condition can cause the open-circuit voltage to be below the predetermined threshold of the subscriber equipment, causing the indicator light to be illuminated and giving a false off-hook indication. This indication is regarded as showing that a line is in use when it actually is not, leading to inefficient use of the telephone system.

SUMMARY OF THE INVENTION

An object of the present invention is to provide a circuit which causes an increased open circuit DC voltage output from a SLIC circuit on the tip and ring lines to avoid false indications of an off-hook condition.

Briefly described, the invention comprises a correction circuit for use in combination with a subscriber line interface circuit (SLIC) of the type having first and second output terminals for supplying a direct current voltage respectively to the tip and ring wires of a telephone circuit and an input terminal for receiving a control signal. The correction circuit includes a differential operational amplifier having an output terminal and inverting and non-inverting input terminals. An output resistor is connected between the output of the operational amplifier circuit and the input terminal of the SLIC. A first circuit including a resistor connects the first output terminal of the SLIC to one of the input terminals of the operational amplifier and a second circuit connects the output resistor and a source of reference voltage to the other of the input terminals of the operational amplifier so that the operational amplifier provides to the SLIC input terminal a current signal for controlling the open-circuit voltage supplied to the tip and ring wires.

BRIEF DESCRIPTION OF THE DRAWINGS

In order to impart full understanding of the manner in which these and other objects are attained in accordance with the invention, a particularly advantageous embodiment thereof will be described with reference to the accompanying drawings, which forms a part of this disclosure, and wherein.

DESCRIPTION OF THE PREFERRED EMBODIMENT

Figure 1:
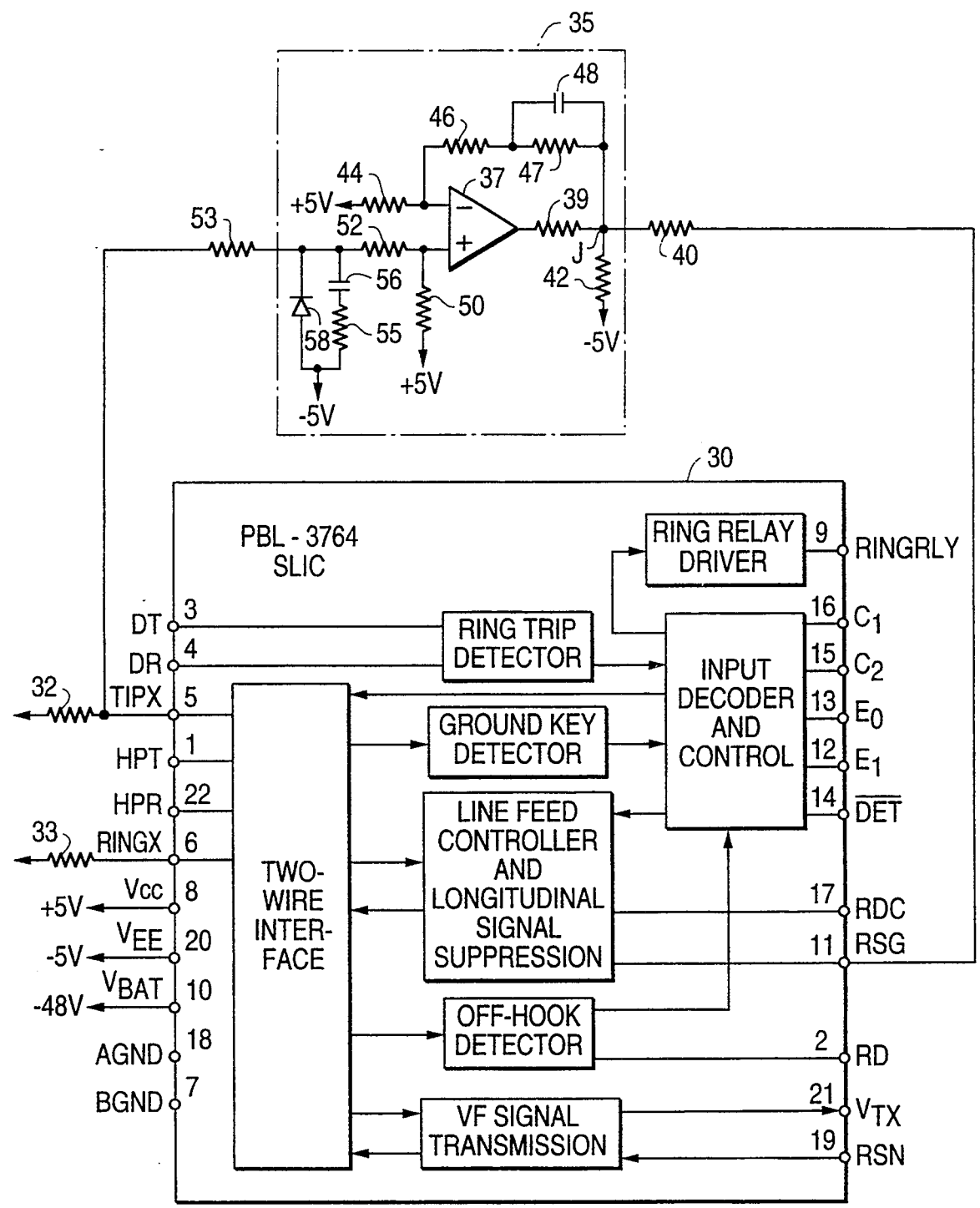
FIG. 1 is a schematic circuit diagram of a circuit in accordance with the invention responsive to tip voltage.

In FIG. 1 is shown a subscriber line interface circuit 30 which is a prior art SLIC of the type PBL-3764 marketed by Ericsson Components AB, Stockholm, Sweden. This circuit functions in a well-known manner and the details of that operation will not be described except as necessary to explain the present invention. As part of that operation, a DC voltage is produced at pins 5 and 6 which are connected to the tip and ring wires, respectively, of the telephone system of which SLIC 30 is a part. In accordance with the manufacturer's directions, the saturation guard pin 11 (RSG) of SLIC 30 is normally connected to pin 20 through a resistor referred to as a saturation guard resistor. $V_{EE}$ pin 20 is connected to $-5$ VDC which, when connected to pin 11 through a resistor of the proper value, causes the production on the tip and ring wires of the DC voltage mentioned above. The tip and ring terminals 5 and 6 are connected through protection resistors 32 and 33 to the tip and ring wires in a conventional manner.

Also of interest to the present invention is the voltage connected to $V_{CC}$ pin 8 which is $+5$ VDC and the system battery voltage $V_{BAT}$ connected to pin 10 of circuit 30.

As mentioned above, the open-circuit voltage on the tip and ring wires can be within a range which sometimes results in false off-hook indications. In accordance with the present invention, the single resistor connection between pins 11 and 20 is replaced by the circuit indicated generally at 35 in FIG. 1 which is a current sink circuit for RSG pin 11.

Circuit 35 includes a differential operational amplifier 37 the output of which is connected through resistors 39 and 40 to RSG pin 11. The junction between those resistors is connected through a resistor 42 to a negative DC supply such as the $-5$ V supply at pin 20 of circuit 30.

The inverting input of amplifier 37 is connected through a resistor 44 to a positive DC supply such as the $+5$ V supply at pin 8 and to the junction of resistors 39, 40 and 42 through a network including series-connected resistors 46 and 47 and a capacitor 48 in parallel with resistor 47.

The non-inverting input terminal of the amplifier is connected through a resistor 50 to the $+5$ V supply and through series-connected resistors 52 and 53 to TIPX pin 5 of circuit 30. A resistor 55 and a capacitor 56 are connected in series with each other between the junction of resistors 52 and 53 and the $-5$ V supply, a diode 58 being in parallel with that resistor-capacitor circuit.

Circuit 35 is a current sink circuit which produces an output voltage at junction J of capacitor 48 and resistors 39, 40, 42 and 47 which causes a current to flow out of SLIC 30 by the voltage difference between that junction and the voltage of the SLIC saturation guard pin 11. The SLIC circuit holds pin 11 at a relatively constant voltage above the −5 V supply regardless of the current drawn from it. The correction circuit operates in conjunction with the SLIC circuit by varying the current drawn from SLIC saturation guard pin 11 until the tip voltage reaches the correct level, typically −3 volts. The SLIC circuitry maintains an average tip-to-ground and ring-to-ground voltage of $V_{BAT}/2$, so the ring lead settles at a level of about 3 volts more positive than battery voltage.

The values of resistors 44, 46, 47, 50, 52, 53 and 55 and capacitors 48 and 56 are selected so that the open loop gain and the unity gain frequency from the tip lead through the operational amplifier circuit and back through the SLIC to the tip lead provide an adequate phase margin, at least 45° of margin at unity gain. The margin is necessary so that the closed loop system does not oscillate. Capacitor 56 and resistor 55 largely determine the unity gain frequency.

The circuit is also optimized for immunity to noise on the +5 V and −5 V supplies. Resistors 44, 50, 46, 47, 39, 40 and 42, capacitor 48 and opamp 37 form a circuit that amplifies noise from the +5 V supply and produces a corresponding current at the output. The stated component values, particularly capacitor 48 and resistor 46, are adjusted for minimum gain over the voice band (about 300 to 3500 Hz). Similarly, resistors 55, 52, 50, 44, 46, 47, 39, 40 and 42, capacitors 48 and 56 and opamp 37 form a circuit that amplifies noise on the −5 V supply and produces a corresponding current at the output. These component values given, particularly the ratio of resistor 46 plus resistor 47 to resistor 44, are selected for minimum gain below and in the voice band (dc to 3500 Hz). Note that minimizing the total gain requires unity gain from the −5 V supply lead through resistor 55 and the circuit to point J. The SLIC maintains the voltage at RSG, pin 11, at a constant voltage above the −5 V supply, so −5 V noise should appear equally at the RSG pin and point J for full cancellation, resulting in no net current change into SLIC 30.

Diode 58 prevents the non-inverting input of the operational amplifier from exceeding the common mode range when the telephone connected to the tip and ring wires goes off-hook. When the telephone goes off-hook, the tip voltage goes well below −5 V. The diode prevents the non-inverting input of the operational amplifier from going much below ground. In the off-hook condition, the operational amplifier output goes toward the level of the negative power supply, so the saturation guard current is set by the values of resistors 39, 40 and 42 only. The limit is set such that the apparent saturation guard voltage never exceeds about 70 volts.

Typical values for the components discussed above are as follows:

| Resistors (in K ohms, except as noted)) | |
|---|---|
| 39 | 46.4 |
| 40 | 4.99 |
| 42 | 4.99 |
| 44 | 768 |
| 46 | 80.6 |
| 47 | 909 |
| 50 | 1.0 M ohms |
| 52 | 100 |

| -continued | |
|---|---|
| 53 | 909 |
| 55 | 4.99 |
| Capacitors | |
| 48 | 0.1 µf |
| 56 | 0.68 µf |

Figure 2:
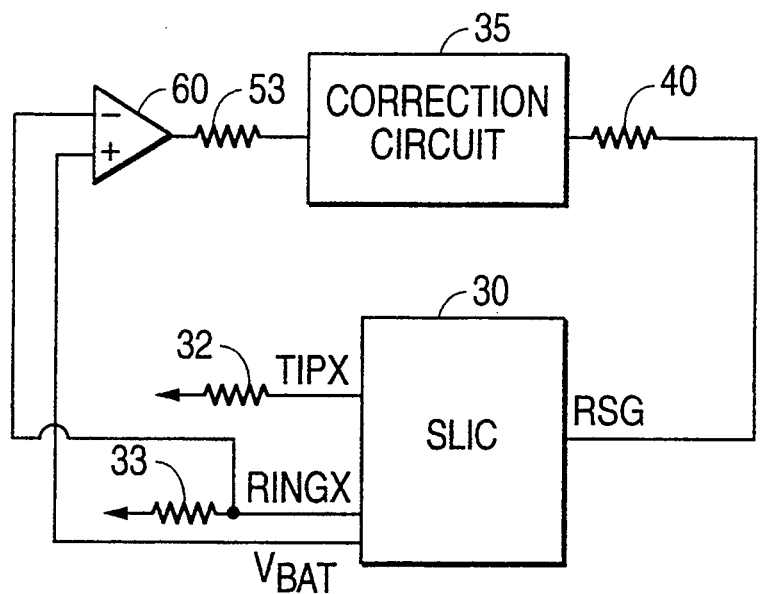
FIGS. 2 and 3 are block diagrams showing further embodiments responsive to ring and tip-ring voltages, respectively.
Figure 3:
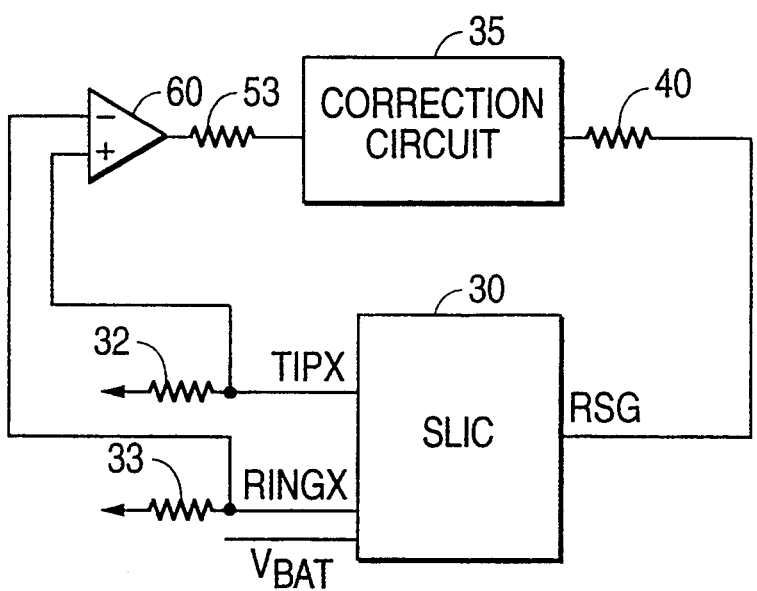

As will be recognized, the circuit of FIG. 1 monitors the voltage on the tip lead. However, the technique according to the invention can also be made to monitor the voltage on the ring lead or the voltage from tip to ring, performing the same overall function. Circuits for this purpose are shown in FIGS. 2 and 3 in block diagram form, the details of circuits 35 and 30 being as shown and described with reference to FIG. 1.

In each case, a differential operational amplifier 60 is added to the circuit, this amplifier having an amplification of unity. To monitor and respond to ring voltage, the inverting input terminal of amplifier 60 is connected to the ring lead and the non-inverting terminal is connected to $V_{BAT}$. The output of amplifier 60 is connected to resistor 53.

To monitor and respond to the voltage difference between tip and ring, the non-inverting input terminal of amplifier 60 is connected to TIPX with the inverting terminal connected to RINGX.

In each case, the operation of the circuit is as described with reference to FIG. 1 and will not be repeated.

While certain advantageous embodiments have been chosen to illustrate the invention, it will be understood by those skilled in the art that various changes and modifications can be made therein without departing from the scope of the invention as defined in the appended claims.

What is claimed is:

1. A telephone system correction circuit comprising:
   a subscriber line interface circuit (SLIC) having a fixed on-hook tip-to-ring voltage over a system battery range when a saturation guard terminal is connected to a fixed voltage and having first and second output terminals for supplying a direct current voltage respectively to tip and ring wires of a telephone circuit;
   a first differential operational amplifier having an output terminal and inverting and non-inverting input terminals;
   resistive circuit means connecting the output of said operational amplifier to said saturation guard terminal of said SLIC;
   first circuit means including a resistor for connecting at least one of said output terminals of said SLIC to an input terminal of said operational amplifier; and
   second circuit means for connecting said resistive circuit means and a source of reference voltage to the other of said input terminals of said operational amplifier so that said operational amplifier provides to said SLIC saturation guard terminal a current signal for controlling the open-circuit voltage supplied to said tip and ring wires.

2. A circuit according to claim 1 wherein said first output terminal of said SLIC is connected through said first circuit means to said non-inverting input terminal of said operational amplifier and said second circuit means is connected to said inverting input terminal.

3. A circuit according to claim 1 wherein said first circuit means includes a second differential operational amplifier having an input terminal connected to said second output terminal of said SLIC and an output terminal connected through said resistor to said input terminal of the first said operational amplifier.

4. A circuit according to claim 1 wherein said first circuit means includes a second differential operational amplifier having input terminals connected respectively to said first and second output terminals of said SLIC and an output terminal connected through said resistor to said input terminal of the first said operational amplifier.

5. A telephone system correction circuit comprising:
a subscriber line interface circuit (SLIC) having first and second output terminals for supplying a direct current voltage respectively to tip and ring wires of a telephone circuit and an input terminal for receiving a control signal, operational amplifier circuit means having a output terminal and operational amplifier input terminals for producing at said output terminal a current proportional to a voltage supplied to said operational amplifier input terminals;

resistive circuit means connecting a current from the output of said operational amplifier circuit means to said input terminal of said SLIC; first circuit means including a resistor for connecting an output terminal of said SLIC to an operational amplifier input terminal; and second circuit means for connecting said resistive circuit means and a source of reference voltage to the other of said operational amplifier input terminals so that said operational amplifier provides to said SLIC input terminal a current signal for controlling the open-circuit voltage supplied to said tip and ring wires.

* * * * *